(12) United States Patent
Purdy et al.

(10) Patent No.: US 11,795,379 B2
(45) Date of Patent: Oct. 24, 2023

(54) USE OF SULFONIC ACIDS IN DOWNHOLE METHODS

(71) Applicant: Fluid Energy Group Ltd., Calgary (CA)

(72) Inventors: Clay Purdy, Medicine Hat (CA); Markus Weissenberger, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 532 days.

(21) Appl. No.: 17/054,356

(22) PCT Filed: May 10, 2019

(86) PCT No.: PCT/CA2019/000066
§ 371 (c)(1),
(2) Date: Nov. 10, 2020

(87) PCT Pub. No.: WO2019/213739
PCT Pub. Date: Nov. 14, 2019

(65) Prior Publication Data
US 2021/0189855 A1    Jun. 24, 2021

(30) Foreign Application Priority Data

May 11, 2018  (CA) ................................ CA 3004675

(51) Int. Cl.
*E21B 43/27* (2006.01)
*C09K 8/74* (2006.01)
(Continued)

(52) U.S. Cl.
CPC ............... *C09K 8/74* (2013.01); *C09K 8/032* (2013.01); *C09K 8/06* (2013.01); *C09K 8/426* (2013.01);
(Continued)

(58) Field of Classification Search
CPC ............ C09K 8/74; E21B 43/27; E21B 33/12
(Continued)

(56) References Cited

U.S. PATENT DOCUMENTS

| 9,926,481 B2 | 3/2018 | Galindo et al. |
| 2008/0227669 A1* | 9/2008 | Welton .................. C11D 1/835 |
| | | 507/239 |

(Continued)

FOREIGN PATENT DOCUMENTS

WO    2018058089 A2    3/2018

OTHER PUBLICATIONS

International Search Report dated Jul. 9, 2019 in International Application No. PCT/CA2019/000066, 3 pages.

*Primary Examiner* — William D Hutton, Jr.
*Assistant Examiner* — Ashish K Varma
(74) *Attorney, Agent, or Firm* — Berg Hill Greenleaf Ruscitti LLP

(57) ABSTRACT

A novel method for the placement of spearhead acid and stimulation of a hydrocarbon-bearing formation, said method comprising the steps of:
  providing a wellbore in need of multiple stages of stimulation;
  inserting an isolation plug in the wellbore at a predetermined location;
  inserting a perforating tool and a spearhead or breakdown acid into the wellbore simultaneously exposing the wireline and tool to the acid;
  positioning the tool at said predetermined location;
  perforating the wellbore with the tool thereby creating a perforated area;
  allowing the spearhead acid to come into contact with the perforated area for a predetermined period of time sufficient to prepare the formation for stimulation;
(Continued)

removing the tool form the wellbore; and
initiating the stimulation of the perforated area using a stimulation fluid.

7 Claims, 6 Drawing Sheets

(51) Int. Cl.
| | |
|---|---|
| C09K 8/06 | (2006.01) |
| C09K 8/54 | (2006.01) |
| E21B 21/00 | (2006.01) |
| E21B 41/02 | (2006.01) |
| E21B 43/26 | (2006.01) |
| E21B 43/119 | (2006.01) |
| E21B 43/28 | (2006.01) |
| C09K 8/42 | (2006.01) |
| C09K 8/46 | (2006.01) |
| C23F 11/04 | (2006.01) |
| C09K 8/03 | (2006.01) |
| C09K 8/60 | (2006.01) |
| E21B 43/116 | (2006.01) |
| E21B 33/12 | (2006.01) |

(52) U.S. Cl.
CPC ............... *C09K 8/46* (2013.01); *C09K 8/54* (2013.01); *C09K 8/602* (2013.01); *C23F 11/04* (2013.01); *E21B 21/00* (2013.01); *E21B 41/02* (2013.01); *E21B 43/119* (2013.01); *E21B 43/26* (2013.01); *E21B 43/27* (2020.05); *E21B 43/283* (2013.01); *C09K 2208/32* (2013.01); *E21B 33/12* (2013.01); *E21B 43/116* (2013.01)

(58) Field of Classification Search
USPC ........................................................ 166/297
See application file for complete search history.

(56) References Cited

U.S. PATENT DOCUMENTS

| | | | |
|---|---|---|---|
| 2013/0118759 A1* | 5/2013 | Crews | E21B 29/02 |
| | | | 166/376 |
| 2014/0202701 A1 | 7/2014 | Patil et al. | |
| 2015/0027702 A1* | 1/2015 | Godoy-Vargas | C09K 8/512 |
| | | | 507/224 |
| 2016/0341017 A1* | 11/2016 | Fu | C09K 8/52 |
| 2016/0347994 A1* | 12/2016 | Purdy | C09K 8/528 |

* cited by examiner

USE OF SULFONIC ACIDS IN DOWNHOLE METHODS

CROSS REFERENCE TO RELATED APPLICATION

This application is a national stage application under 35 U.S.C. 371 of PCT Application No. PCT/CA2019/000066 having an international filing date of May 10, 2019, which designated the United States, which PCT application claimed the benefit of Canadian Application Serial No. 3,004,675, filed May 11, 2018, both of which are incorporated by reference in their entirety.#

FIELD OF THE INVENTION

This invention relates to method for performing enhanced recovery operations on a hydrocarbon-bearing stimulation, more specifically to a method to enhance well productivity by substantially reducing time and water use when performing downhole hydraulic fracturing or workover operations.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become under-productive due to scaling issues or formation depletion.

Acidizing is a type of stimulation treatment which is performed above or below the reservoir fracture pressure in an effort to initiate, restore or increase the natural permeability of the reservoir. Acidizing is achieved by pumping acid, predominantly hydrochloric acid, into the well to dissolve typically limestone, dolomite and calcite cement between the acid insoluble sediment grains of the reservoir rocks or to treat scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations.

A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir (wormholing) and stimulating the flow of hydrocarbons to the wellbore for recovery.

While matrix acidizing is done at a low enough pressure to keep from fracturing the reservoir rock, fracture acidizing involves pumping acid into the well at a very high pressure, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore. There are many different mineral and organic acids used to perform an acid treatment on wells. The most common type of acid employed on wells to stimulate production is hydrochloric acid (HCl), which is useful in stimulating carbonate reservoirs.

It has been estimated that fracking can improve the production of a well by at least 10-20%. Also, as is well known to the person of ordinary skill in the art, a well can be fracked multiple times during its production life. The process of hydraulic fracturing or fracking requires the following steps. Once the determination of the wellbore's integrity has been assessed, the location of the perforations is determined. Subsequently, after a cement liner is in place, one must clear out the debris, and pump a plug and perforating guns to a desired depth and location. The plug is set slightly beyond the desired location to be stimulated and then the cemented liner in that zone is perforated by using perforating guns, creating a path for fracking fluid to be forced into the shale formation.

The final stage prior to fracking requires the use of perforating guns, typically a string of shaped charges lowered to a predetermined location within the wellbore. Once in position, the perforating gun is discharged and perforates the casing.

According to the conventional process, after perforation stage is completed, the tools are removed from the well. A ball is pumped down to isolate the zones below the plug. This method applies to solid bridge plugs (no ball) with which method it is required to squeeze wellbore fluid into the perforations at low or reduced rates until acid reaches the perforations and increases permeability to initiate a fracture and reduce injection pressures and also applies to "ball in cage" or other processes where the isolation ball can be placed just prior to, during or immediately after the perforating is completed.

A large volume of fracturing fluid is then pumped into the desired formation in a well. The high-pressure at which the fracturing fluid is pumped coupled with the constant pumping provide an increase in the fluidic pressure within the formation which leads to fracturing inside the reservoir.

After the fracturing pressure is reached fracturing fluid containing propping agents (proppant) are injected into the formation to increase the fractures within the formation and insert proppant to maintain the fractures open. The last step of the fracturing operation before being put back into production is to flush the well form all the loose proppants and fracturing fluids.

A slickline is a single strand wire used in the oil and gas industry transport tools within a well. It is typically a single wire strand set up on a spool located on what is referred to as a slickline truck. A slickline is connected by the drum it is spooled off the back of the slickline truck. A slickline is used to lower tools within a wellbore in order to perform a specific operation. Although not common for perforating work, slickline still has the potential to be involved in various workover activities. Wireline (or electric line) is the traditional way to run perforating guns or systems. Wireline provides the advantages of real-time depth control, high tensile strength, long term cycling life spans and selective firing control of the perorating system.

In highly deviated wells, flow restricted wells or specific other mechanical or stimulation methods may require coiled tubing to be utilized to transport or place the perforation guns into position, i.e. at a predetermined location. Modern slickline, coiled tubing or wireline may also allow incorporated integrated information transmission technology which can communicate real time information to the operator including but not limited to; depth, temperature and pressure. This type of information provides operators sufficient information to perform a plug and perforation operation by accurately targeting desirable hydrocarbon-bearing formations.

The benefit of this strategy is greater control of the placement of perorations and thus the stimulation. In many cases, casing the entire wellbore allows the operator better control of the stimulation, production and other life-cycle aspects of the reservoir fluids. It also allows the operator to select the formation which will be stimulated in order to obtain increased well production. It also allows the operator to seal off perforated sections, which have had their hydrocarbons extracted or are producing minimal oil or gas etc.

Accordingly, in light of the state of the art of fracking technology, there still exists a need to successfully develop a method or improve the current process which reduces the waste of water, minimizes equipment time on each stage of the process, provides a more optimal, reduced injection rate for the stage, provide a method and chemical to ensure optimal diversion of acid across all perforations as currently acid will tend to go the path of least resistance due to down-hole fluid dynamics. Most acid will only reach the top portion of perforations causing an increased or non-optimal injection rate and associated pressures during the stimulation. The resolution of this problem lies in combining a chemical composition with the mechanical tools in a specific order to achieve a more efficient oil recovery process.

Methanesulfonic acid is a well-known acid applicable of deployment into a number of varied industrial operations. One such industry capable of using vast amounts of this acid is the oil and gas industry.

One major drawback of the use of acids such as methanesulfonic acid is it is more prone to lead to a pitting type corrosion rather than "uniform corrosion" as seen with, for example, HCl or hydrochloric acid. Pitting corrosion is a localized form of corrosion by which cavities or "holes" are produced in the exposed material. Pitting is considered to be more damaging than uniform corrosion damage because it is more difficult to detect, predict and design against and also leads to localized integrity failures faster than uniform corrosion. A small, narrow pit with minimal overall metal loss can lead to the failure of an entire engineering system. Pitting corrosion, which, for example, is a common denominator of all types of localized corrosion attack, may assume different shapes and forms. Pitting corrosion can produce pits with their mouth open (uncovered) or covered with a semi-permeable membrane of corrosion filming products. Pits can be either hemispherical or cup-shaped.

There are several reasons why pitting corrosion is difficult to predict or to design against. Some of these reasons include: pitting corrosion can be initiated by a localized chemical or mechanical damage to the protective oxide film. This type of damage may stem from several water chemistry factors such as acidity, low dissolved oxygen concentrations (which tend to render a protective oxide films less stable) and high concentrations of chloride (as in seawater and produced water). Pitting corrosion can also be initiated by localized damage to, or poor application of, a protective coating. A third non-negligible factor for the initiation of pitting corrosion resides in the presence of non-uniformities in the metal structure of the component, e.g. non-metallic inclusions causing potential fluid cavitation.

Theoretically, a local cell that leads to the initiation of a pit can be caused by an abnormal anodic site surrounded by normal surface which acts as a cathode, or by the presence of an abnormal cathodic site surrounded by a normal surface in which a pit will have disappeared due to excessive uniform corrosion. In the second case, post-examination should reveal the local cathode, since it will remain impervious to the corrosion attack as in the picture of an aluminum specimen shown on the right. Most cases of pitting are believed to be caused by local cathodic sites in an otherwise normal surface.

Apart from the localized loss of thickness, corrosion pits can also be harmful by acting as stress risers and failure points. Fatigue and stress corrosion cracking may initiate at the base of corrosion pits. One pit in a large system can be enough to produce the catastrophic failure of that system. An extreme example of such catastrophic failure happened recently in Mexico, where a single pit in a gasoline line running over a sewer line was enough to create great havoc to a city, killing 215 people in Guadalajara.

Pitting corrosion is a very dangerous form of acid corrosion, even if the overall mass loss (lb/ft2 or mm/year) is still low, but due to the focused corrosion at a few spots there is a creation of weak points in the metal. These weak points, caused by the pits, can lead to a catastrophic material failure. Methanesulfonic acid (MSA) at high temperatures (130° C. and higher) is very prone for pitting corrosion, much more than HCl.

Despite this propensity to cause pitting corrosion, it seems that sulfonic acids could advantageously be used in the oil and gas industry to perform breakdown or spearhead operations because of its affinity to remove/dissolve cement. One application which could greatly benefit from this property is the spearhead or breakdown stage, where cement removed from the casing after a perforation operation to ensure that a subsequent stimulation stage of the process can be performed with minimal clogging/blocking from cement and to assist in lowering injection pressures of the stimulation fluid.

Accordingly, in light of the state of the art of stimulation being utilized in the oil and gas industry, there still exists a need to develop a method which not only reduces water usage but can provide at least one other advantage such as time savings, corrosion protection and allow operators to perforate in acid or near acid by placing the acid during the plug and perforate stage of the completion. The resolution of this problem lies, in part, in combining a chemical composition with the mechanical tools in order to achieve a more efficient method.

SUMMARY OF THE INVENTION

It is an object of the present invention to provide for a novel method for stimulating a well which overcomes some drawbacks or limitations of known prior art processes. According to a first aspect of the present invention there is provided a method for the fracking or stimulation of a hydrocarbon-bearing formation, said method comprising the steps of:

providing a wellbore in need of stimulation;
inserting an isolation plug in the wellbore at a predetermined location;
inserting a perforating tool and a spearhead or breakdown acidic composition into the wellbore, where the acidic composition comprises a sulfonic acid and, optionally, a corrosion inhibitor;
positioning the tool at a predetermined location;
perforating the wellbore with the tool thereby creating a perforated area thereby allow access from the wellbore to the formation;
allowing the acidic composition to come into contact with the perforated area, cement and formation for a predetermined period of time sufficient to prepare the formation for stimulation;

removing the tool form the wellbore; and
initiating the stimulation of the perforated area using a stimulation fluid.

Preferably, the spearhead acidic composition comprises a corrosion inhibitor adapted to prevent damaging corrosion to the perforating tool, wireline, casing and any other associated equipment during the period of exposure with said components. Preferably, the perforating tool is a perforating gun. More preferably, the acidic composition is balanced so as to minimize the corrosion on the tool, wireline/slickline, casing or tubing. Even more preferably, the sulfonic acid content is balanced to optimize the financial aspect of performing downhole operations (including but not limited to stimulation) by removing a step from the conventional, very widely utilized plug and perforate process, resulting in the savings of water and crew and equipment time.

Preferably, the method employs the concurrent administration of a sulfonic acid while the bottom hole assembly is located within the wellbore. This allows operators to save substantial time and consequently money as well as avoids the need for the displacement of the water within the wellbore to place or spot the spearhead acid "after" the tool is removed from the wellbore, as is or was the standard procedure prior to this invention.

Preferably also, the sulfonic acid is selected from the group consisting of: methanesulfonic acid; ethanesulfonic acid, propanesulfonic acid, toluenesulfonic acid; sulfamic acid, and the like and combinations thereof. More preferably, the sulfonic acid is selected from the group consisting of: toluenesulfonic acid and sulfamic acid.

According to a preferred embodiment of the present invention, the method uses an acidic composition where said corrosion inhibiting composition comprises: citral and cinnamaldehyde.

Preferably, the corrosion inhibiting composition comprises: an alkyne alcohol; a terpene, preferably selected from the group consisting of: citral; carvone; ionone; ocimene; cymene; and combinations thereof, most preferably the terpene is citral; cinnamaldehyde or a derivative thereof and a solvent. More preferably, the corrosion inhibiting composition further comprises at least one surfactant. Preferably, the alkyne alcohol is propargyl alcohol. Preferably, the solvent is selected from the group consisting of: methanol; ethanol; a 6,3-ethoxylate; and isopropanol. More preferably, the solvent is isopropanol.

Preferably, the alkyne is present in an amount ranging from 10-40% v/v of the composition. Preferably also, citral is present in an amount ranging from 5-15% v/v of the composition. Preferably also, the cinnamaldehyde or a derivative thereof is present in an amount ranging from 7.5-20% v/v of the composition. Preferably also, the solvent is present in an amount ranging from 10-40% v/v of the composition. According to a preferred embodiment of the present invention, the surfactant is present in an amount ranging from 10-40% v/v of the composition. Preferably, the surfactant comprises a betaine or a sultaine. According to a preferred embodiment, the surfactant comprises a betaine and ß-Alanine, N-(2-carboxyethyl)-N-dodecyl-, sodium salt (1:1).

Preferably, the corrosion inhibiting composition further comprises a metal iodide or iodate selected from the group consisting of: cuprous iodide; potassium iodide and sodium iodide.

According to another aspect of the present invention there is provided a method for spotting or placing acid in a wellbore, said method comprising the steps of:
providing a wellbore in need of stimulation;
inserting an isolation plug in the wellbore at a predetermined location;
inserting a perforating tool and a spearhead or breakdown acid composition, into the wellbore simultaneously, wherein said acidic composition comprising a sulfonic acid;
positioning the tool at a predetermined location;
perforating the wellbore with the perforating tool thereby creating a perforated area; and
allowing the spearhead acid to come into contact with the perforated area for a predetermined period sufficient to complete or substantially complete the acid spotting operation in one step.

According to a preferred embodiment of the present invention, the corrosion inhibitor composition is effective at a temperature of up to 110° C., and, in some preferred compositions, effective at temperature of up to 130° C., and in some even more preferred compositions, the compositions are stable and effective at temperatures of up to 170° C.

Preferably, the acidic composition comprising the sulfonic acid provides effective corrosion inhibition to both carbon steel alloys as well as stainless steel and stainless-steel alloys for the duration period the tools, casing and wireline/slickline are exposed to the acidic composition. Preferably, the acidic composition is optimized to provide long-term corrosion protection and render the wireline/slickline, casing and downhole tools and bottom hole assemblies reusable many times over. Such long-term protection is even more desirable as it compounds the water savings as well as other time savings.

BRIEF DESCRIPTION OF THE FIGURES

Features and advantages of embodiments of the present application will become apparent from the following detailed description and the appended figures, in which.

DESCRIPTION OF THE INVENTION

Figure 1:
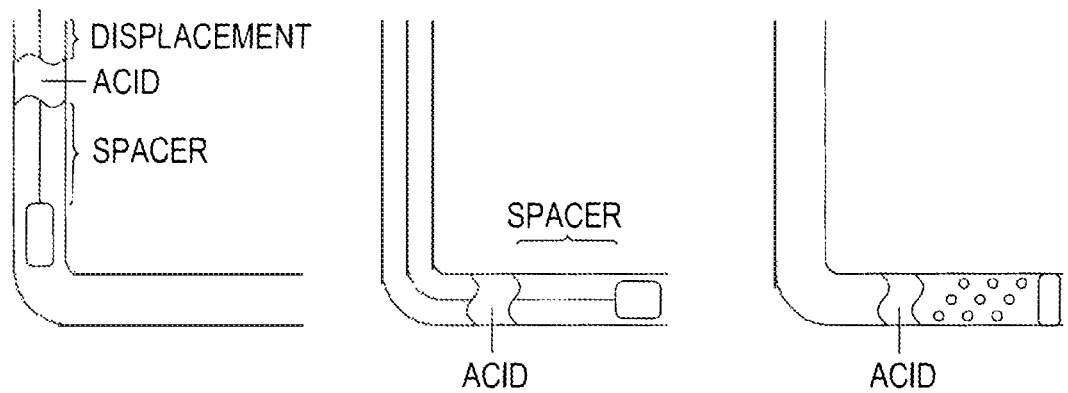
FIG. 1 is a schematic diagram illustrating the general steps according to a preferred method of the present invention.

The description that follows, and the embodiments described therein, is provided by way of illustration of an example, or examples, of particular embodiments of the principles of the present invention. These examples are provided for the purposes of explanation, and not limitation, of those principles and of the invention.

In a conventional plug and perforation operation, the zonal isolation plug is set in the well, the zone of interest is perforated by a tool (guns), then the tool is pulled out of the hole and then acid is pumped and circulated to the perforations (this method can take hours in some cases depending on the isolation system or operational challenges) and once a feed rate is reached, the stimulation crew begin the frac or stimulation for that stage. The method is then repeated up to the number of stages applicable (over 40-100 in many cases).

According to a preferred embodiment of the present invention, the method allows for an operator to pump the tools downhole concurrently with the spearhead acid to perforate the zone and let the acid sit over the perforations or near the perforations. This is followed by the removal of the tool from the wellbore and initiating of the fracturing or stimulation immediately. During the operation, the tool, casing and wireline/slickline are exposed to the acidic composition. This method allows one to avoid having to remove the tool and wireline/slickline as well as save the water which was present in the wellbore while the tool was performing the desired operation. In the conventional process, the displacement of this wellbore column of water prior to the injection and placement of the acid for breakdown of the cement, takes additional time. The method according to a preferred embodiment of the present invention circumvents that step altogether as the acid is pumped or placed along with the perforating tool, therefore there is no need to displace wellbore water to place the acid and this stage of the common plug and perforate process is simply skipped and this similarly translates into time and water savings also resulting in more stages being completed per day.

According to a preferred embodiment of the present invention, this method can save up to one (1) hour per stage (or even more in the case of some tight formations, flow limiting components, wellbore restrictions, mechanical failures etc.) at an average cost of $20,000/hr (for a frac crew) and up to or over 15,000 gallons of water per stage. In a 50-stage well, this can translate into savings of potentially over $1,000,000 in time plus the saved water of up to 750,000 gallons. The potential savings from the implementation of this method in operations in the United States alone could reach upwards of several hundreds of millions of dollars per year and many millions of gallons of water conserved, greatly reducing the strain on the current water supply and management infrastructure.

HCl is the most commonly used acid in fracking or well stimulation. With this in mind, one must understand that perforation tools, casing, tubulars and other wellbore completion tools or equipment are mostly made of alloys high in stainless steel and or chrome to ensure longevity, high tensile yields and long cycle lifespans, as well as to provide superior corrosion protection from wellbore fluids and gases, but not from standard HCl or acidic fluids and thus it is highly advantageous to have strong acid systems that can be deployed with such equipment with minimal concern for corrosion yet remain fully effective. Conventional plug and perforation processes require the removal of the perforation guns immediately after the perforation stage otherwise the spearhead acid would destroy the perforating guns over time because of its propensity to attack corrosion resistant alloys or alloys high in stainless steel content, in particular 316 stainless steel. Although industry has made efforts to further minimize corrosion concerns with coated wire-line systems, the risk of acid penetrating coatings, having adverse exposure effects or becoming trapped between armor and cable materials is still a major concern for the industry.

A critical factor in allowing an acid intensive process or procedure to have stainless steel alloys exposed to strong acids such as HCl or synthetic, organic or modified acids is the ability to control, minimize or virtually eliminate corrosion to a level below which would render a stainless-steel tool, wire-line or cable unusable after only a few uses (or even less) as corrosion can greatly alter the tensile yield of the cables or wire-line risking the loss of a tool which would then require an expensive fishing or recovery process. Many wire-line cables and perforating tool packages can cost many hundreds of thousands of dollars to replace or repair due to corrosion or catastrophic failures.

With the implementation of a method according to the present invention as well as the application of an acidic composition comprising a sulfonic acid and a corrosion inhibitor which affords protection to stainless steel from damage from exposure to a sulfonic acid, there is a never before seen possibility for a large scale commercially viable method where a step is removed from the conventional pre-stimulation process, thereby saving substantial time, money and/or water resources. The advantages are compounded when using optimal acidic compositions (i.e. effectiveness and corrosion inhibition) as more wells and more perforation operations can be carried out per day. The savings are compounded by the number of operations which are carried out without replacing the bottom hole assembly and/or the wireline/slickline or coiled tubing or repairing damage etc.

According to a preferred embodiment of the present invention, one can use a ball-in-cage apparatus to plug the wellbore below the area to be perforated as the acidic composition (comprising the corrosion inhibitor) provides sufficient corrosion protection to maintain the integrity of the ball system for a desired period of time.

Example 1

Formulation of a Sulfonic Acid Composition

To prepare a sulfonic acid composition to use in a method according to a preferred embodiment of the present invention, one follows this possible solubilization process (although there may be several other preparation processes). For an acidic composition containing a 50 wt % p-TSA, one first weighs out 150 g of solid p-TSA into a beaker or flask. Then the solid is diluted with water up to a 250 ml mark. Start by combining the toluenesulphonic acid with the water and mix thoroughly for a few minutes until the solid is fully dissolved. Subsequently, if desired the additives can be added. For example, according to one embodiment, one adds 2-Propyn-1-ol, complexed with methyloxirane, and potassium iodide. Circulation is maintained until all products have been solubilized. Table 1 lists the components of the composition of Example 1, including their weight percentage as compared to the total weight of the composition and the CAS numbers of each component.

Similarly, to prepare a 30 wt % p-TSA composition, one takes 75 g solid p-TSA and places it in a beaker and then dilutes up to 250 mL with water. To make 1000 mL of a 50 wt % p-TSA composition one weighs 500 g of solid p-TSA and adds 620 ml of water. To make 1000 mL of a 30 wt % p-TSA composition, one weighs 300 g of solid p-TSA and adds 768 mL or water.

TABLE 1

Composition of an acid composition used in subsequent testing

| Chemical | 30 Wt % Composition | 50 Wt % Composition |
|---|---|---|
| Water | 72% | 55% |
| p-Toluene Sulphonic Acid | 28% | 45% |

The resulting composition of Example 1 is a clear, odourless liquid having shelf-life of greater than 1 year. At 30 wt %, it has a specific gravity of 1.083±0.02. At 50 wt %, it has a specific gravity of 1.132±0.02. It is completely soluble in water and its pH is less than 1.

Preferably, the surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from C8 to C16. Most preferably, the amido betaine comprising a hydrophobic tail from C8 to C16 is cocamidobetaine. Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate. Preferably, the corrosion inhibition package comprises cocamidopropyl betaine and ß-Alanine, N-(2-carboxyethyl)-N-dodecyl-, sodium salt (1:1).

Preferably, when preparing an acidic composition comprising a corrosion inhibition package, metal iodides or iodates such as potassium iodide, sodium iodide, cuprous iodide and lithium iodide can be added as corrosion inhibitor intensifier. According to another preferred embodiment of the present invention, the metal iodide or iodate is sodium iodide. According to yet another preferred embodiment of the present invention, the metal iodide or iodate is cuprous iodide. The iodide or iodate is preferably present in a weight/volume percentage ranging from 0.05 to 1.5%, more preferably from 0.25 to 1.25%, yet even more preferably 1% by weight/volume of the acidic composition. Most preferably, the iodide used is potassium iodide. Preferably, the corrosion package comprises: 2-Propyn-1-ol, compd. with methyloxirane; ß-Alanine, N-(2-carboxyethyl)-N-dodecyl-, sodium salt (1:1); cocamidopropyl betaine; (±)-3,7-Dimethyl-2,6-octadienal (Citral); cinnamaldehyde; and isopropanol.

More preferably, the composition comprises 20% of 2-Propyn-1-ol, compd. with methyloxirane; 20% of ß-Alanine, N-(2-carboxyethyl)-N-dodecyl-, sodium salt (1:1); 20% of cocamidopropyl betaine; 7.5% of (±)-3,7-Dimethyl-2,6-octadienal (Citral); 12.5 wt. % cinnamaldehyde; and 20% of Isopropanol (all percentages are volume percentages). A point of note, the surfactant molecules comprise only roughly ⅓ of the actual content of the entire surfactant blend as the balance, roughly ⅔, is comprised of water so as to control the viscosity of the surfactant when admixed with the other components. This is typical of surfactant blends in this and other industries.

According to a preferred embodiment of the method of present invention, the corrosion inhibitor composition or package comprises cinnamaldehyde or a derivative thereof selected from the group consisting of: cinnamaldehyde; dicinnamaldehyde p-hydroxycinnamaldehyde; p-methylcinnamaldehyde; p-ethylcinnamaldehyde; p-methoxycinnamaldehyde; p-dimethylaminocinnamaldehyde; p-diethylaminocinnamaldehyde; p-nitrocinnamaldehyde; o-nitrocinnamaldehyde; 4-(3-propenal)cinnamaldehyde; p-sodium sulfocinnamaldehyde p-trimethylammoniumcinnamaldehyde sulfate; p-trimethylammoniumcinnamaldehyde o-methylsulfate; p-thiocyanocinnamaldehyde; p-(S-acetyl)thiocinnamaldehyde; p-(S—N,N-dimethylcarbamoylthio)cinnamaldehyde; p-chlorocinnamaldehyde; α-methylcinnamaldehyde; β-methylcinnamaldehyde; α-chlorocinnamaldehyde α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde and p-methyl-α-pentylcinnamaldehyde.

Table 2 includes a prior composition (CI-5) and a preferred composition for use in a method according to a preferred embodiment of the present invention (CI-5SS).

TABLE 2

Composition of various tested corrosion inhibitor packages

|  |  | CI-5 | CI-5SS |
|---|---|---|---|
| 2-Propyn-1-ol, compd. with methyloxirane | Vol % | 45 | 20 |
| .beta.-Alanine, N-(2-carboxyethyl)-N-dodecyl-, sodium salt (1:1) | Vol % | 11.7 | 20 |
| Cocamidopropyl betaine | Vol % | 11.7 | 20 |
| (±)-3,7-Dimethyl-2,6-octadienal (Citral) | Vol % | 7 | 7.5 |
| Cinnamaldehyde | Vol % | 0 | 12.5 |
| Isopropanol | Vol % | 24.6 | 20 |
|  | Total Vol % | 100 | 100 |

Solubility Testing

To evaluate the solubilizing strength of preferred sulfonic acid compositions used in preferred methods according to the present invention, various strength compositions were tested at various temperatures on calcium carbonate and dolomite. The results are set out in Tables 3 (on calcium carbonate) and 4 (on dolomite).

TABLE 3

Results of the Acid Solubility test on Calcium Carbonate using a 30% or 50% p-TSA composition according to Example 1

| Fluid | Temp/ °C. | Acid Volume/ml | Initial Weight | Final Weight | Weight Loss/g | Total Solubility - kg/m³ |
|---|---|---|---|---|---|---|
| 50% p-TSA | 20 | 50 | 10.0 | 5.1 | 4.9 | 98.0 |
| 50% p-TSA | 55 | 50 | 10.0 | 4.7 | 5.3 | 106.0 |

TABLE 3-continued

Results of the Acid Solubility test on Calcium Carbonate using a 30% or 50% p-TSA composition according to Example 1

| Fluid | Temp/ °C. | Acid Volume/ml | Initial Weight | Final Weight | Weight Loss/g | Total Solubility - kg/m$^3$ |
|---|---|---|---|---|---|---|
| 50% p-TSA | 90 | 50 | 10.0 | 4.6 | 5.4 | 108.0 |
| 30% p-TSA | 20 | 50 | 10.0 | 7.17 | 2.8 | 56.0 |
| 30% p-TSA | 20 | 100 | 10.0 | 2.1 | 7.9 | 79.0 |

TABLE 4

Results of testing for the solubility of dolomite using a 30% or 50% p-TSA composition according to Example 1

| Fluid | Temp/° C. | Acid Volume/ml | Initial Weight | Final Weight | Weight Loss/g | Total Solubility - kg/m$^3$ |
|---|---|---|---|---|---|---|
| 50% p-TSA | 20 | 50 | 10.0204 | 9.9752 | 0.0452 | 0.9 |
| 30% p-TSA | 20 | 50 | 10.0037 | 10.0355 | −0.0318 | 0.0 |

Metal Scale Solubilizing Testing

To evaluate the metal solubilizing strength of preferred sulfonic acid compositions used in preferred methods according to the present invention, various strength compositions were tested at a temperature of 20° C. to determine their solubilizing strength on iron sulfide and zinc sulfide. Both metal sulfides represent possible scales found inside wellbores during oil and gas operations. The ability of an acid to dissolve such scale will greatly contribute to minimizing well shut downs from reduced flow due to scaling issues. The metal sulfide solubility results are set out in Tables 5 (iron sulfide) and 6 (zinc sulfide).

TABLE 5

Acid solubility test results using a 30% or 50% p-TSA composition according to Example 1 with iron sulfide

| Fluid | Temperature/ °C. | Acid Volume/ml | Initial Weight | Final Weight | Weight Loss/g | Total Solubility - kg/m$^3$ |
|---|---|---|---|---|---|---|
| 50% p-TSA | 20 | 50 | 10.0242 | 11.7331 | −1.7089 | 0.0 |
| 30% p-TSA | 20 | 50 | 10.0007 | 5.2489 | 4.7518 | 95.0 |

TABLE 6

Acid solubility test results using a 30% or 50% p-TSA composition according to Example 1 with zinc sulfide

| Fluid | Temperature/ °C. | Acid Volume/ml | Initial Weight | Final Weight | Weight Loss/g | Total Solubility - kg/m$^3$ |
|---|---|---|---|---|---|---|
| 50% p-TSA | 20 | 50 | 3.0409 | 2.7214 | 0.3195 | 6.4 |
| 30% p-TSA | 20 | 50 | 5.0035 | 11.3276 | −6.3241 | 0.0 |

Corrosion Testing

Sulfonic acid compositions used in preferred methods according to the present invention underwent corrosion testing. Various steel grades were exposed to compositions according to the present invention for various exposure duration and temperatures. Depending on the intended use/application of an acidic fluid composition comprising a corrosion inhibitor package, a desirable result would be one where the lb/ft$^2$ corrosion number is at or below 0.05. A more desirable result would be one where the corrosion (in lb/ft$^2$) is at or below 0.02. Where applicable the fluids (aqueous acidic compositions) were diluted as indicated. Tables 7 to 17 summarize the corrosion testing using sulfonic acids on various metals and at various temperatures,

TABLE 7

Corrosion results on various metals exposed to a 50% p-TSA composition comprising various corrosion inhibitor packages (steel density = 7.86 g/cc) (at 90° C. and a pressure of 0 psi)

| Steel type | Duration (hour) | CI package | Total wt loss (g) | Surface area (cm$^2$) | Density (g/cc) | Mils/year | Mm/year | Lb/ft$^2$ |
|---|---|---|---|---|---|---|---|---|
| J55 | 6 | 0.5% CI-5, 0.25% CI-1A, 0.1% NE-1 | 0.1191 | 30.129 | 7.86 | 289.083 | 7.343 | 0.008 |
| N80 | 6 | 0.5% CI-5, 0.25% CI-1A, 0.1% NE-1 | 0.2605 | 31.806 | 7.86 | 598.948 | 15.213 | 0.017 |
| QT-800 | 6 | 0.5% CI-5, 0.25% CI-1A, 0.1% NE-1 | 0.2916 | 30.129 | 7.86 | 707.781 | 17.978 | 0.020 |
| QT-100 | 6 | 0.5% CI-5, 0.25% CI-1A, 0.1% NE-1 | 0.2114 | 30.129 | 7.86 | 513.117 | 13.033 | 0.014 |

CI-1A refers to potassium iodide;
CI-5 refers to a proprietary corrosion inhibitor package comprising a terpene; a cinnamaldehyde or a derivative thereof; at least one amphoteric surfactant; and a solvent.

TABLE 8

Corrosion results on various metals exposed to a 30% p-TSA composition comprising various corrosion inhibitor packages (steel density = 7.86 g/cc) (at 90° C. and a pressure of 0 psi)

| Steel type | Duration (hour) | CI package | Total wt loss (g) | Surface area (cm$^2$) | Density (g/cc) | Mils/year | Mm/year | Lb/ft$^2$ |
|---|---|---|---|---|---|---|---|---|
| J55 | 6 | 1% CI-5CNE | 0.0806 | 30.129 | 7.86 | 195.635 | 4.969 | 0.005 |
| N80 | 6 | 1% CI-5CNE | 0.2955 | 31.806 | 7.86 | 679.421 | 17.257 | 0.019 |
| QT-800 | 6 | 1% CI-5CNE | 0.1599 | 30.129 | 7.86 | 388.115 | 9.858 | 0.011 |
| QT-100 | 6 | 1% CI-5CNE | 0.1314 | 30.129 | 7.86 | 318.938 | 8.101 | 0.009 |

CI-5CNE refers to a proprietary corrosion inhibitor package comprising a terpene; a cinnamaldehyde or a derivative thereof; at least one amphoteric surfactant; potassium iodide; and a solvent.

TABLE 9

Corrosion results on various metals exposed to a 50% p-TSA composition comprising various corrosion inhibitor packages (steel density = 7.86 g/cc) (at 55° C. and at a pressure of 0 psi)

| Steel type | Duration (hour) | CI package | Total wt loss (g) | Surface area (cm$^2$) | Density (g/cc) | Mils/year | Mm/year | Lb/ft$^2$ |
|---|---|---|---|---|---|---|---|---|
| 1018CS | 168 | 0.5% CI-5, 0.25% CI-1A, 0.1% NE-1 | 0.1112 | 34.710 | 7.86 | 8.367 | 0.213 | 0.007 |
| A7075 | 168 | 0.5% CI-5, 0.25% CI-1A, 0.1% NE-1 | 0.7622 | 32.064 | 2.81 | 173.660 | 4.411 | 0.049 |

CI-1A refers to a 10 wt % solution of potassium iodide in water;
CI-5 refers to a proprietary corrosion inhibitor package comprising a terpene; a cinnamaldehyde or a derivative thereof; at least one amphoteric surfactant; and a solvent.

TABLE 10

Corrosion results on various metals exposed to a 30% p-TSA composition comprising various corrosion inhibitor packages (steel density = 7.86 g/cc) (at 55° C. and a pressure of 0 psi)

| Steel type | Duration (hour) | CI package | Total wt loss (g) | Surface area (cm$^2$) | Density (g/cc) | Mils/year | Mm/year | Lb/ft$^2$ |
|---|---|---|---|---|---|---|---|---|
| 1018CS | 168 | 1% CI-5CNE | 0.2346 | 34.710 | 7.86 | 17.653 | 0.448 | 0.014 |
| A7075 | 168 | 1% CI-5CNE | 0.0533 | 32.064 | 2.81 | 12.144 | 0.308 | 0.003 |

CI-5CNE refers to a proprietary corrosion inhibitor package comprising a terpene; a cinnamaldehyde or a derivative thereof; at least one amphoteric surfactant; potassium iodide; and a solvent.

TABLE 11

Corrosion results on various metals exposed to a 50% p-TSA composition comprising various corrosion inhibitor packages (steel density = 7.86 g/cc) (at a pressure of 400 psi) for a duration of explosure of 6 hours

| Steel type | Temp (° C.) | CI package | Total wt loss (g) | Surface area (cm$^2$) | Mils/year | Mm/year | Lb/ft$^2$ |
|---|---|---|---|---|---|---|---|
| J55 | 130 | 1.75% CI-5, 1.5% CI-1A, 0.1% NE-1 | 0.1647 | 30.129 | 399.765 | 10.154 | 0.011 |
| N80 | 130 | 1.75% CI-5, 1.5% CI-1A, 0.1% NE-1 | 0.2933 | 31.806 | 674.363 | 17.129 | 0.019 |
| QT-800 | 130 | 1.75% CI-5, 1.5% CI-1A, 0.1% NE-1 | 0.4422 | 30.129 | 1073.322 | 27.262 | 0.030 |
| QT-100 | 130 | 1.75% CI-5, 1.5% CI-1A, 0.1% NE-1 | 0.2682 | 30.129 | 650.984 | 16.535 | 0.018 |

TABLE 12

Corrosion results on various metals exposed to a 30% p-TSA composition comprising various corrosion inhibitor packages (steel density = 7.86 g/cc) (at a pressure of 400 psi) for a duration of exlosure of 6 hours

| Steel type | Temp (° C.) | CI package | Total wt loss (g) | Surface area (cm$^2$) | Mils/year | Mm/year | Lb/ft$^2$ |
|---|---|---|---|---|---|---|---|
| J55 | 130 | 1% CI-5CNE | 0.1140 | 30.129 | 276.705 | 7.028 | 0.008 |
| N80 | 130 | 1.75% CI-5, 1.5% CI-1A, 0.1% NE-1 | 0.1532 | 31.806 | 352.241 | 8.947 | 0.010 |
| QT-800 | 130 | 1.75% CI-5, 1.5% CI-1A, 0.1% NE-1 | 0.1970 | 30.129 | 478.165 | 12.145 | 0.013 |
| QT-100 | 130 | 1% CI-5CNE | 0.1098 | 30.129 | 266.510 | 6.769 | 0.007 |

TABLE 13

Corrosion results on various metals exposed to a 50% p-TSA composition comprising various corrosion inhibitor packages (steel density = 7.86 g/cc) (at a pressure of 0 psi and a temperature 90° C.) with a duration exposure of 6 hours and a coupon surface are of 34.710 cm$^2$

| Steel type | CI package | Wt loss (g) | Density (g/cm$^2$) | Mils/year | Mm/year | Lb/ft$^2$ |
|---|---|---|---|---|---|---|
| Super duplex 2507 | 0.75% CI-5, 0.5% CI-1A, 0.1% NE-1 | 0.0045 | 7.75 | 9.616 | 0.244 | 0.000 |
| duplex 2205 | 0.75% CI-5, 0.5% CI-1A, 0.1% NE-1 | 0.0247 | 7.70 | 53.122 | 1.349 | 0.001 |

TABLE 14

Corrosion results on various metals exposed to a 50% p-TSA (dry acid) composition comprising various corrosion inhibitor packages (steel density = 7.86 g/cc) (at a pressure of 400 psi and a temperature 150° C.) with a duration exposure of 6 hours

| Steel type | CI package | Wt loss (g) | Surface area (cm$^2$) | Mils/year | Mm/year | Lb/ft$^2$ |
|---|---|---|---|---|---|---|
| N80 | 1% CI-5CNE | 0.2064 | 31.806 | 474.560 | 12.054 | 0.013 |
| QT-800 | 1% CI-5CNE | 0.2104 | 30.129 | 510.690 | 12.972 | 0.014 |

With respect to the corrosion impact of the composition on typical oilfield grade steel, it was established that it was clearly well below the acceptable corrosion limits set by industry for various applications.

Corrosion & Aging Testing

Additional corrosion testing was carried out to investigate the effect of aging the toluenesulfonic acid in solid form after the application of a liquid corrosion inhibitor composition onto the acid and the corrosiveness of various compositions according to preferred embodiments of the present invention. The results are listed in Tables 15 and 16. This is to examine the product shelf life and the results indicate that the compositions have excellent properties in terms of steel protection.

TABLE 15

Corrosion results on N80 metal exposed to a 30% p-TSA or 50% p-TSA composition at various temperature and days of aging corrosion inhibitor package in dry acid prior to dilution with water

| Days | Coupon | 30% p-TSA 90° C. | 30% p-TSA 150° C. | 50% p-TSA 90° C. | 50% p-TSA 150° C. |
| --- | --- | --- | --- | --- | --- |
| 1 | N80 | 0.019 | 0.028 | 0.010 | 0.016 |
| 5 | N80 | 0.017 | 0.047 | 0.005 | 0.014 |
| 14 | N80 | 0.150 | 0.034 | 0.007 | 0.009 |
| 60 | N80 | 0.010 | 0.023 | 0.006 | 0.014 |

TABLE 16

Corrosion results on QT-900 metal exposed to a 30% p-TSA or 50% p-TSA composition at various temperature and days of aging corrosion inhibitor package in dry acid prior to dilution with water

| Days | Coupon | 30% p-TSA 90° C. | 30% p-TSA 150° C. | 50% p-TSA 90° C. | 50% p-TSA 150° C. |
| --- | --- | --- | --- | --- | --- |
| 1 | QT-900 | 0.008 | 0.013 | 0.006 | 0.013 |
| 5 | QT-900 | 0.008 | 0.015 | 0.005 | 0.009 |
| 14 | QT-900 | 0.008 | 0.019 | 0.005 | 0.006 |
| 60 | QT-900 | 0.007 | 0.024 | 0.006 | 0.008 |

TABLE 17

Corrosion results on QT-900 metal exposed to a 50% p-TSA composition at various temperature for a 6-hour exposure time

| Temp (° C.) | Coupon | Serial # | Corrosion (lb/ft$^2$) | Observations |
| --- | --- | --- | --- | --- |
| 90 | J55 | B622 | 0.008 | No Pits |
| 90 | N80 | A742 | 0.007 | No Pits |
| 90 | QT-800 | A378 | 0.008 | No Pits |
| 90 | QT400 | A704 | 0.007 | No Pits |
| 130 | J55 | B623 | 0.011 | No Pits |
| 130 | N80 | A830 | 0.019 | No Pits |
| 130 | QT-800 | A379 | 0.030 | Pits |
| 130 | QT400 | A706 | 0.018 | Pits |
| 90 | Super Duplex 2507 | A011 | 0 | No |
| 90 | Duplex 2205 | A010 | 0.001 | No |
| 150 | N80 | A838 | 0.013 | |
| 150 | QT-800 | A376 | 0.014 | |

The collected data confirms that the methods according to the present invention can be carried out using a sulfonic acid, preferably when the sulfonic acid is selected from the group consisting of: MSA, TSA and sulfamic acid. The testing results confirms the feasibility of a widespread implementation of the method according to a preferred embodiment of the present invention where the step of removing the perforating tool prior to injection or placement of the spearhead acidic composition, for example. The inventors have also noted that by carefully balancing the acidic composition % content of the active sulfonic acid component (for example TSA) with an appropriate corrosion inhibitor or blend of several components to obtain a good performance corrosion inhibitor package one may apply this type of method to various other oilfield downhole operations where the acidic composition comprises a corrosion inhibitor and is sufficiently balanced to complete said operations within a reasonable time period which will leave the tool with minimal corrosion damage from exposure to the acidic composition.

Balancing comprises but should not be understood as being limited to, altering the pH constantly as the dissolved cement raises the pH of the system as it is drilled out in a drilling with acid application as an example. In the method where rate of penetration (ROP) is being increased by drilling with acid, it is desirable to maintain the minimal pH required "only" so as to ROP to the optimal rate. Usually, the cement is not drilled out with pure acid (unless very tough drilling or maybe only to initiate the job) so as to control costs, reduce corrosion concerns etc.

According to a preferred embodiment, the balancing of the acidic composition is done by adding more of at least one of the components present in the corrosion inhibitor package itself present in the undiluted acidic composition.

According to a preferred embodiment, the balancing of the acidic composition is done by altering the pH constantly as the dissolved cement raises the pH of the system as it is being dissolved by the acidic composition.

Typically, to perform and plug and perf operation, the concentration of the acid can vary. According to a preferred embodiment, the CI package and content is determined in accordance in order to optimize the financial aspect of the operation. This involves balancing the sulfonic acidic composition, the CI package (price and performance) and value of the damage to the bottom hole assembly tool as well as the coil tubing or wireline or slickline and casing used during the operation. The balancing of the acid % content, corrosion inhibition composition and duration of exposure as well as temperature of exposure is done to achieve specific and sometimes arbitrary needs of an operator. It will be apparent to the person of ordinary skill in the art that a variation of the method according to a preferred embodiment of the present invention can be implemented depending on the circumstances without falling outside the scope of the present invention. Hence, when an operator performs a method according to the present invention, the method may be carried out with the optic of minimizing water usage (where in some places water is more scarce than other places), or minimizing the crew/equipment time (where in some cases that is the highest cost step in the method), or minimizing the damage to the wireline/slickline, casing and tools or bottom hole assemblies (where this is a more important factor for the operator), or in some cases the operator will want to have an optimal method which balances tool wear, water usage reduction and minimized crew time.

Field Application of a Composition According to a Preferred Method

Field trials were conducted using a method according to a preferred embodiment of the present invention. Subsequently, hydrogen embrittlement testing was conducted on the specific tubular metallurgy (P-110) and positive results were noted (i.e. minimal effect vs HCl results).

After the initial successful trials, the following was noted: there was a reduction in time per stage with the new ability to spot acid near or over perforations. It was estimated that an average of 15-50 minutes per stage were saved in comparison with the current displacement rates and operational program that was being utilized prior to this technology. Savings of water required at location due to the elimination of the step of displacing the entire wellbore to spot the acid after wire-line/BHA were out of the wellbore were also noted to be very substantial. Moreover, the operator noted that a significant advantage of being able to reduce the loads of acid coming to site and storage requirement as the product was deployed or diluted on the fly in many cases from a concentrate resulting in one truckload yielding three truckloads of deployable acid.

As illustrated in FIG. 1, pumping acid downhole while the wireline and perforating tool is present downhole has been shown in the field to save, in some instances 15 minutes per perforation operation. Moreover, the savings of water are equally staggering. The following is but a list of substantial advantages of performing such a process: combining pumping down the plug with displacing the ball and acid; reducing pumpdown cycle time; reducing fluid volumes required. The concerns noted by the operators were the following: defining fluid bypass around the plug; the method was dependent on the rate the plug was being pumped; and the rate achieved for pumpdown was variable from stage to stage.

Wireline Testing Experiments

Specific tests for a modified acid composition comprising an alkanolamine:HCl blend (present in a molar ratio of 1:6.4 also containing a corrosion inhibitor package) (diluted to one third of its stock solution, i.e. 33%) and a commercialised 7.5% HCl acid blend (containing a CI package) spearhead blend were performed on wire line samples to simulate long term field exposure conditions under extreme conditions at the request of a global oil company. Due to cool down effect and limited real world exposure times, these tests would be indicative of a long-term duty cycle.

The tensile strength and corrosion tests were executed on wire line samples provided by Company B. One sample was exposed to 33% alkanolamine:HCl composition and another sample was exposed to the 7.5% HCl acid blend for 96 and 120 consecutive hours at 90° C. (194° F.) at 600 psi. The weight loss of the wire line samples is expected to be attributed not only the corrosion of the steel but also the degradation of the binding material. After the corrosion test cycle, tensile strength testing was conducted on two strands pulled from the wire line exposed to the 33% alkanolamine:HCl composition. The tensile strength values for each strand were equal to control samples that were not exposed to the acid. Tensile strength testing was not performed on the wire line exposed to the 7.5% HCl acid blend due to excessive corrosion.

Corrosion data obtained previously (tables 8 to 17) confirms that the implementation of a method according to a preferred embodiment of the present invention could lead to both decreased corrosion on the wireline/slickline and tool and bottom hole assembly as well as a substantial decrease in water usage as well as crew time.

P110 Coupon Corrosion Tests

Long term corrosion tests on P110 coupons with a 33% alkanolamine:HCl composition and the 7.5% HCl acid blend at 90° C. (194° F.) were also carried out. The corrosion properties of the 33% alkanolamine:HCl composition was observed to provide superior protection in comparison to the 7.5% HCl acid blend over a long time period. The testing allows to select an ideal composition which will minimize corrosion to the wireline over a number of plug and perf operations. However, it should be noted that a less than optimal acidic composition (comprising a corrosion inhibitor) may be employed in order to substantially reduce time spent on pre-frac operations, minimize water volumes used and therefore, provide a financial advantage of performing this method as well as a substantial water usage reduction over the conventional approach used prior to this novel process.

Procedure: To determine the corrosion properties of unspent 33% alkanolamine:HCl composition and the 7.5% HCl acid blend (containing a CI package), the acid blends were evaluated at 90° C. (194° F.) on P110 coupons for 96 hours (4 days) at ambient pressure. The corrosion tests were executed in samples jars in a water bath. The corrosion rates were determined from the weight loss after the coupons were washed and dried.

Results: The testing results confirms the feasibility of a widespread implementation of the method according to a preferred embodiment of the present invention where the step of removing a perforating tool prior to injection of the spearhead acid composition is removed and the tool remains downhole during the acid breakdown step.

Field Trial

A major E&P company operating in Western Canada performing horizontal multi-stage slickwater completions on multi well pads. Using plug and perf completion technique they were targeting the Duvernay and Montney formations. Reservoir temperatures were approximately 230° F. Historically 15% HCl acid was used to breakdown the formation and assist in fracture propagation.

Figure 2A:
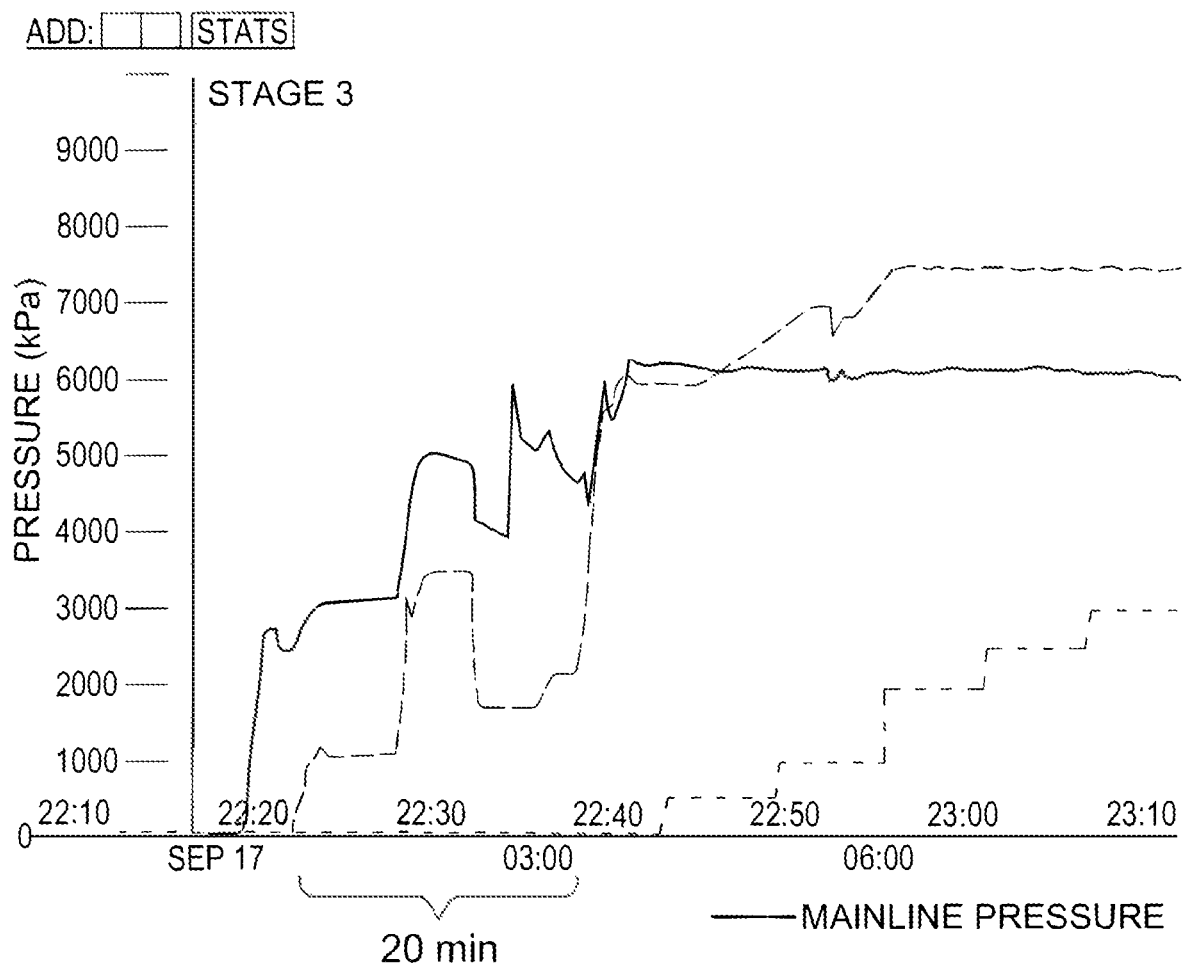
FIG. 2 illustrates a side-by-side comparison of the injection procedure in pre-fracking and fracking operations, the left graph showing the conventional method and the right graph showing a preferred embodiment of the method according to the present invention.
Figure 2B:
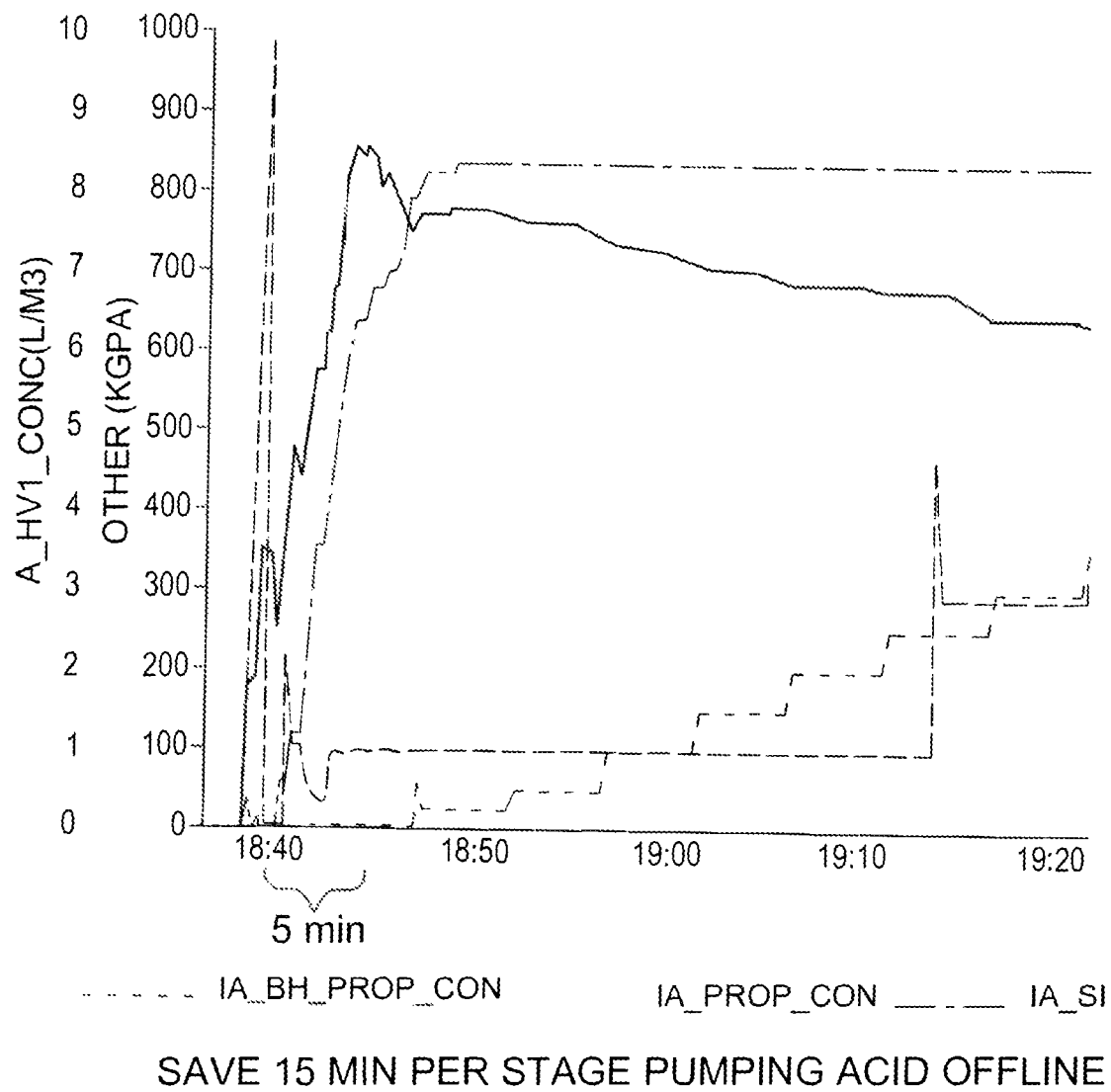

Approximately 97,500 gals of a modified acid using an alkanolamine:HCl composition with a corrosion package was delivered to location. Dilutions ranged from a 2-1 water-acid ratio to yield a 33% modified acid concentration and 1-1 for a 50% dilution. The blended modified acid (1300 gal) was placed in the wellbore and then the wireline and pump-down crews continued to the next well. As the treatment commenced, crews displaced acid to perforations with frac water. Once the acid reached the perforations an immediate pressure drop was observed, all frac pumps were brought on-line to pre-engineered rates and operations commenced. FIG. 2 illustrates the time advantage of using an embodiment of the method of the present invention (right graph) in comparison to the conventional method (left graph).

A significant pressure drop was observed as the acid reached the perforations and it was noted that breakdowns looked very similar to that obtained with 15% HCl which had been previously pumped on the same pad. Both the service company and operator were very pleased with the performance, ease of use of the acid while utilizing a technically advanced, safer and more environmentally responsible product along with eliminating corrosion concerns was a major value add to the customer and all involved with the project. The modified acid composition allowed the company to have confidence that the casing metals were free from hydrogen embrittlement and any corrosion related issue that would have arisen by utilizing HCl. This time saving method would not be possible with any existing HCl blends offered in the market. Observations by the crew included the time savings. Moreover, the company and pumping crews on location had the opportunity to use an acid which has an inherent safety profile adapted to minimize or eliminate the extremely dangerous properties associated with 15% HCl. Some of the safety factors include: less-corrosive to dermal tissue; low-vapor pressure effect (fuming); low-toxicity (Calculated LD-50 Rat); lower bioaccumulative effect; and biodegradable.

Along with the safety aspect of the acid composition used, there is also the technical advantages it brought to the operations: low corrosion properties-<0.02 lb/ft$^2$ for more than 24 hrs; pump acid with wireline BHA (save time and water); in the event of surface equipment failure occur, there is no need to flush acid out of wellbore; the composition is hauled as a concentrate and diluted on location; provides the ability to adjust acid strength for tougher breakdowns; fewer acid trucks on the road (landowner optics); it is a class one product (chemicals will not separate out over time); and it can be diluted with available water (produced/sea water/fresh). Additional benefits of the modified acid used in the example include: ultra-low long term corrosion effects (168 hrs); no precipitation of solubilized Ca post pH increase (eliminating risks of formation damage); clear: low fuming/vapor pressure; aggressive reaction rates on stimulations and workovers; custom blend allowing spotting of acid with perforating guns via wireline; compatible with typical elastomers used in oil and gas; allows to adjust concentrations on the fly to target optimal pay zones; and it has a high thermal stability up to ~190° C.

Field Trial #2

Figure 3:
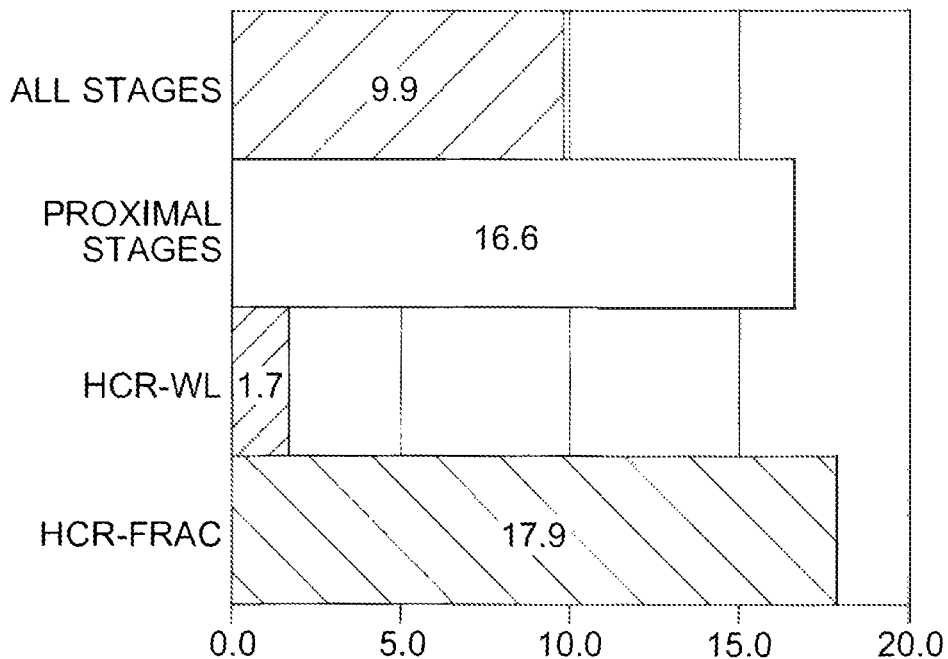
FIG. 3 illustrates a side-by-side bar graph comparison of the various stage times in the pre-fracking and fracking operations, the left graph showing a preferred embodiment of the method according to the present invention, the right graph showing the conventional process.
Figure 3:
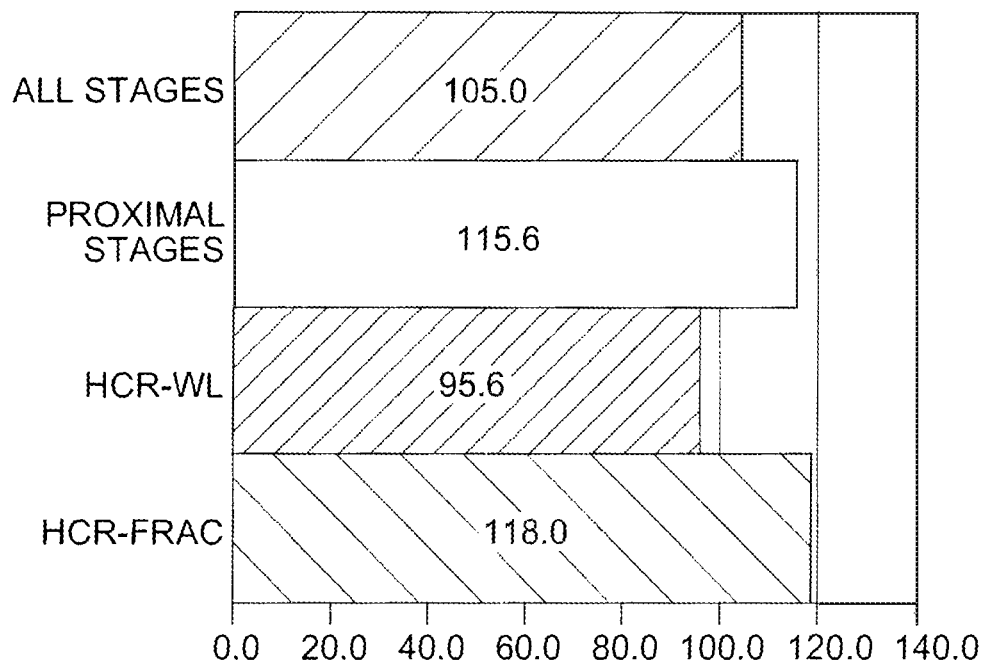

Another large Oil and Gas company carried out wireline plug and perf operations and collected the below information in terms of performance. The average time from start of pumping to start of sand was determined to be 8.2 mins faster for wireline stages where the tools and wireline went downhole together, compared to the average of all other stages. The average stage pump times were determined to be 9.4 mins lower for the Wireline stages where acid was injected along with the perforating tool and wireline, compared to average of all other stages. See FIG. 3 which highlights the difference in time for each step.

The company using the method according to a preferred embodiment of the present invention, noted the following spearhead operational efficiencies: the ability to pump acid with wire line and BHA (guns and bridge plug); the elimination of the need to displace acid after wireline is out of the hole; the reduced water requirements; savings of at least one hole volume per frac (>10,000 gal water reduction per stage); allowing acid to be spotted over the entire perf interval cluster; more effective cluster breakdown; increased frac crew efficiency; and shorter time to initiate the frac and get to job rates.

Figure 4:
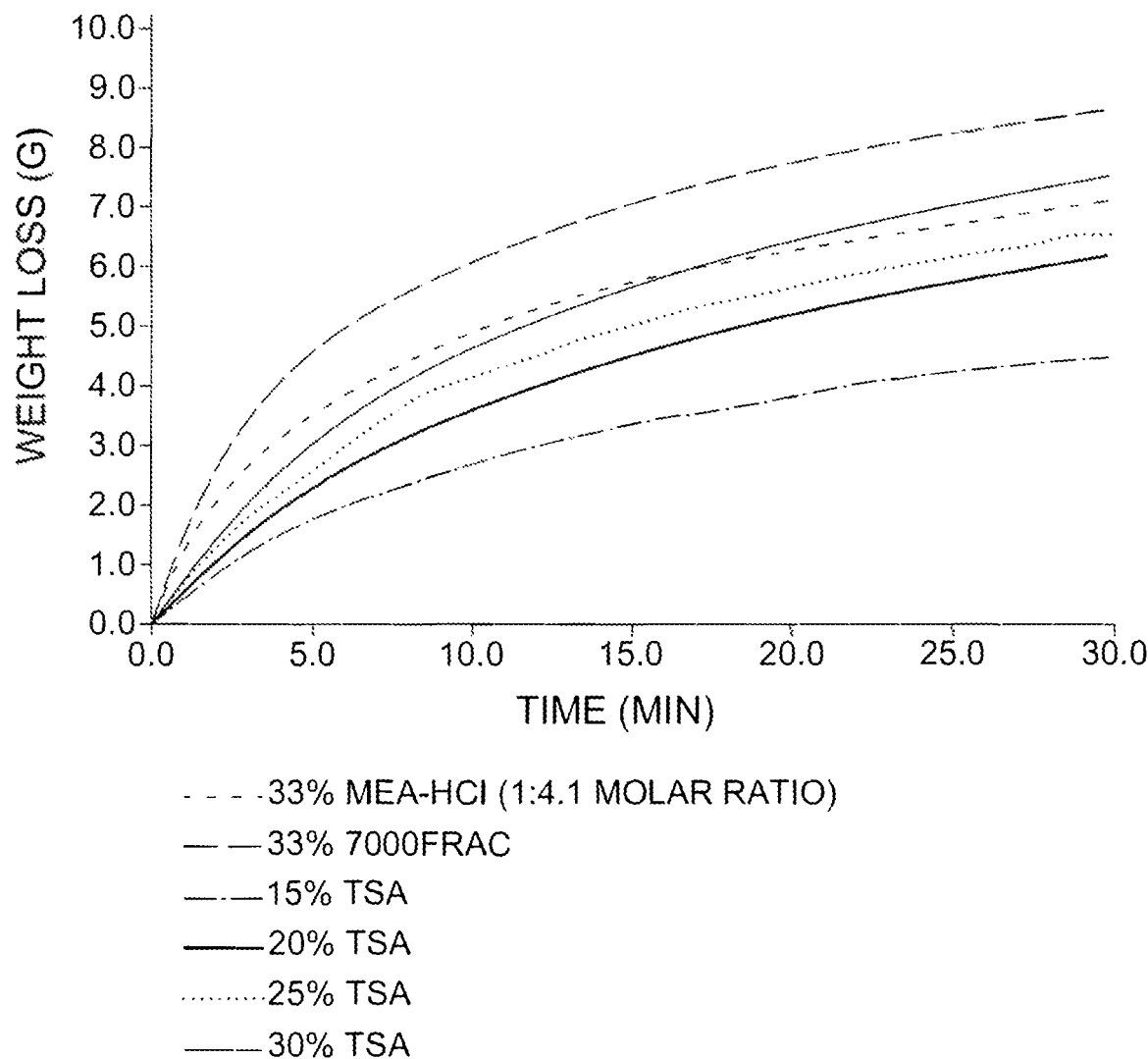
FIG. 4 is a graph showing acid spending with calcium carbonate as a function of time for various acidic compositions used in the method according to the present invention.
Figure 5:
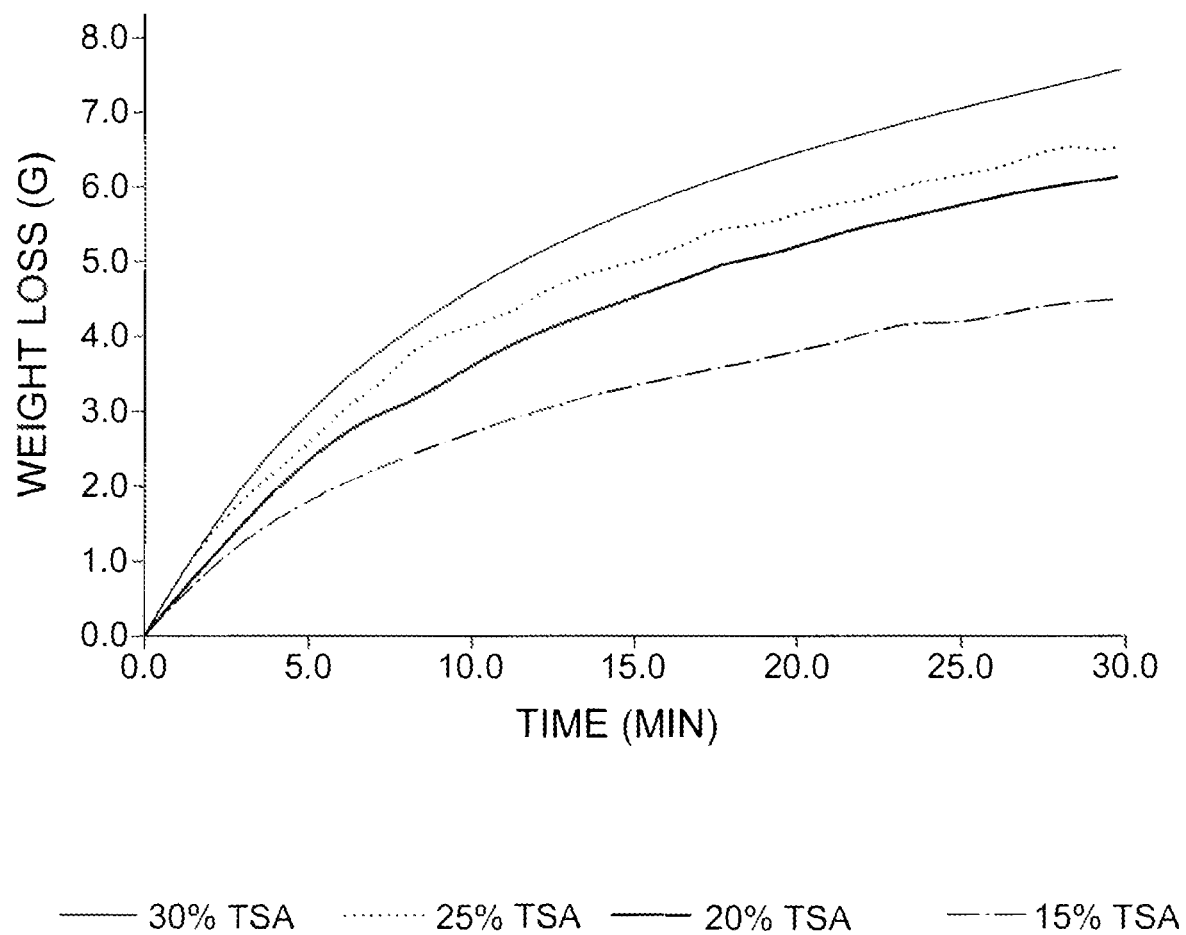
FIG. 5 is a graph showing acid spending with calcium carbonate as a function of time for various acidic compositions used in the method according to the present invention.

FIGS. 4 and 5 are graphs which illustrates the calcium carbonate solubilization power of TSA. Combined with the corrosion data found herein and the field trials, one can conclusively determine that sulfonic acids (optionally in the presence of an appropriate CI package) can be used in the methods according to preferred embodiment of the present invention.

According to another aspect of the present invention, there is provided a method to perform a downhole operation for drilling with acid to increase ROP (rate of penetration) through cement plugs or carbonate formations, said method comprises the following steps:
    inserting a drilling tool inside a wellbore;
    injecting an acidic composition concurrently with the drilling tool;
    positioning the drilling tool within the wellbore at a point requiring drilling;
    contacting the surface requiring drilling with the acid and begin drilling; and
    continue the drilling operation until desired drilled distance has been achieved;

where the acidic composition comprises a sulfonic acid and a corrosion inhibitor and is sufficiently balanced to complete the operation of dissolving the acid soluble debris within a time period which will leave the tool with acceptable (in some cases, minimal) corrosion damage from exposure to the acidic composition.

According to another aspect of the present invention, there is provided a method to perform a downhole operation for coiled tubing deployed acid washes, said method comprises the following steps:
    inserting a coiled tubing inside a wellbore;
    injecting an acidic composition concurrently with the coiled tubing;
    position the coiled tubing within the wellbore at a point requiring an acid wash treatment;
    contacting the surface requiring acid wash treatment with the acid; and
    continue the acid wash treatment operation until predetermined treatment has been achieved;

where the acidic composition comprises a sulfonic acid and a corrosion inhibitor and is sufficiently balanced to complete the operation of dissolving the acid soluble debris within a time period which will leave said tool with acceptable (in some cases, minimal) corrosion damage from exposure to the acidic composition.

According to another aspect of the present invention, there is provided a method to perform a downhole operation for coiled tubing deployed stimulation treatments said method comprises the following steps:
    inserting a coiled tubing inside a wellbore;
    injecting an acidic composition concurrently with the coiled tubing
    position the coiled tubing within the wellbore at a point requiring a treatment on said formation;
    contacting the surface requiring treatment with the acidic composition; and
    allow contact between the acidic composition and the formation until the formation has been effectively treated, where the acidic composition comprises a sulfonic acid and a corrosion inhibitor and is sufficiently balanced to complete the operation of stimulation within a time period which will leave the tool with acceptable (in some cases, minimal) corrosion damage from exposure to the acidic composition.

According to another aspect of the present invention, there is provided a method to perform a downhole operation for dissolving plugs and/or balls; wherein said method comprises the following steps:
    injecting an acidic composition down the wellbore at a position proximate said ball with the use of coiled tubing or by bullheading or another placement method;
    allowing sufficient contact time for the acidic composition to dissolve ball and or plug to allow further processing to occur, where the acidic composition comprises a sulfonic acid and a corrosion inhibitor and is sufficiently balanced to complete the operation of dissolving the plug and/or ball within a time period which will leave the tool, tubing, casing or other exposed equipment with acceptable (in some cases, minimal) corrosion damage from exposure to the acidic composition.

According to another aspect of the present invention, there is provided a method to perform a downhole operation for slower (matrix) rate isolated (thru coil) or high rate acid stimulations, wherein said method comprises the following steps:

providing a wellbore comprising at least one area requiring acid stimulation;
injecting an acidic composition down the wellbore at a position proximate said area requiring acidization;
allowing sufficient contact time for the acidic composition to perform the acidization or stimulation step;
optionally, removing the tool;
optionally, further process the acidized or treated formation, where the acidic composition comprises a sulfonic acid and a corrosion inhibitor and is sufficiently balanced to complete the operation of dissolving the acid soluble formation or scale within a time period which will leave the tool with acceptable (in some cases, minimal) corrosion damage from exposure to the acidic composition.

According to another aspect of the present invention, there is provided a method to perform a downhole operation for fishing tools in the presence of an acid to consume acid soluble formation, metal or cement debris on top of the tool or item to be recovered, wherein said method comprises the following steps:
injecting an acidic composition down the wellbore concurrently with a fishing tool spear or overshot at a position proximate said tool or item to be recovered;
allowing sufficient contact time for the acidic composition to dissolve ball to allow further processing to occur.

where the acidic composition comprises a sulfonic acid and a corrosion inhibitor and is sufficiently balanced to complete the operation of dissolving the acid soluble debris within a time period which will leave the tool with acceptable (in some cases, minimal) corrosion damage from exposure to the acidic composition.

According to another aspect of the present invention, there is provided a method to perform a downhole operation for stuck coil or pipe or tools in casing or open hole, where the sticking is caused by an acid soluble debris, said method comprising the steps of:
injecting an acidic composition in the wellbore;
pumping the acidic composition to a point within the wellbore where said coil or pipe is stuck
allowing the acidic composition sufficient contact time at and near said area to allow the acid soluble debris to be dissolved by the acidic composition, where the acidic composition comprises a sulfonic acid and a corrosion inhibitor and is sufficiently balanced to complete the operation of dissolving the acid soluble debris within a time period which will leave the tool with acceptable (in some cases, minimal) corrosion damage from exposure to the acidic composition, and wherein the acidic composition comprises a corrosion inhibitor package as described above. Preferably, the following are some of the tools that may be used as part of a bottom hole assembly (BHA): drilling motors; washing tools; perforating guns; fishing tools; plugs; balls; any BHA with a high stainless steel metal content in general.

According to another aspect of the present invention, there is provided a method to perform a debris and scale management inside wellbores when having both a tool and an acid present at the same time. According to a preferred embodiment of a method of the present invention, one can perform spotting acid to dislodge stuck pipes inside a wellbore. Preferably, coiled tubing or a BHA (bottom hole assembly) injected into the wellbore can help free downhole in situ items like chokes or flow-controls, safety valves, etc. According to a preferred embodiment of a method of the present invention, one can perform an operation to clean a wellbore with a reaming or wash tool in the presence of an acid.

According to another aspect of the present invention, there is provided a method to perform a downhole operation for spotting a spearhead acid in a wellbore, said method comprising the steps of:
providing a wellbore in need of stimulation;
inserting a plug in the wellbore at a predetermined location;
inserting a perforating tool and a spearhead or breakdown acid into the wellbore simultaneously;
positioning the tool and acid at said predetermined location;
perforating the wellbore with the tool thereby creating a perforated area; and
allowing the spearhead acid to come into contact with the perforated area for a predetermined period of time sufficient or perforating in the acid if applicable, where the acidic composition comprises a sulfonic acid and a corrosion inhibitor and is sufficiently balanced to complete the operation of dissolving the acid soluble debris within a time period which will leave the tool with acceptable (in some cases, minimal) corrosion damage from exposure to the acidic composition.

According to a preferred embodiment of the method, the aqueous acidic composition comprises a corrosion inhibitor package selected from the group consisting of:
(a) quaternary amines (15-40 wt. %), acetylenic alcohols (1-10 wt. %), prop-2-yn-1-ol (1-10 wt. %), naphthalene (1-5 wt. %), aliphatic hydrocarbons (30-60 wt. %), and propan-2-ol (5-10 wt. %);
(b) a mixture containing quaternary ammonium salts (11-30 wt. %), benzyl chloride quaternary ammonium compound (11-30 wt. %), propargyl alcohol (1-10 wt. %), dimethyl formamide (1-10 wt. %), cuprous iodide (1-10 wt. %), ethoxylated nonylphenol (1-10 wt. %), and isopropanol solvent (10-30 wt. %); and
(c) a mixture containing quaternary amines (10-20 wt. %), formamide (20-40 wt. %), acetylenic alcohols (5-10 wt. %), 2-propyn-1-ol (5-10 wt. %), ethoxylated nonylphenol (5-10 wt. %), pine oil (1-5 wt. %), and methanol and isopropanol sol-vent (20-40 wt. %).

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:
1. A method for the fracking or stimulation of a hydrocarbon-bearing formation, said method comprising the steps of:
providing a wellbore in need of stimulation;
inserting a plug in the wellbore at a location slightly beyond a predetermined location;
inserting a perforating tool and a spearhead or breakdown aqueous acidic composition into the wellbore, wherein the aqueous acidic composition comprises quaternary amines, acetylenic alcohols, prop-2-yn-1-ol, naphthalene, aliphatic hydrocarbons, and propane-2-ol;
positioning the tool at said predetermined location;
perforating the wellbore with the tool thereby creating a perforated area;

allowing the spearhead acid to come into contact with the perforated area for a predetermined period of time sufficient to prepare the formation for fracking or stimulation;

removing the tool form the wellbore; and initiating the fracking or stimulation of the perforated area using a stimulation fluid.

2. The method according to claim 1, wherein the acidic composition further comprises a sulfonic acid selected from the group consisting of: methanesulfonic acid; ethanesulfonic acid; propanesulfonic acid toluenesulfonic acid; and sulfamic acid.

3. The method according to claim 1, wherein the aqueous acidic composition further comprises a corrosion inhibitor adapted to prevent damaging corrosion to the tool during the period of exposure with said tool.

4. A method according to claim 3, where the aqueous acidic composition further comprises a corrosion inhibitor package selected from the group consisting of:
  (a) a mixture containing quaternary ammonium salts (11-30 wt. %), benzyl chloride quaternary ammonium compound (11-30 wt. %), propargyl alcohol (1-10 wt. %), dimethyl formamide (1-10 wt. %), cuprous iodide (1-10 wt. %), ethoxylated nonylphenol (1-10 wt. %), and isopropa-nol solvent (10-30 wt. %); and
  (b) a mixture containing quaternary amines (10-20 wt. %), formamide (20-40 wt. %), acetylenic alcohols (5-10 wt. %), 2-propyn-1-ol (5-10 wt. %), ethoxylated nonylphenol (5-10 wt. %), pine oil (1-5 wt. %), and methanol and isopropanol sol-vent (20-40 wt. %).

5. The method according to claim 1, wherein the tool is a perforating gun.

6. An integrated method for the perforating a casing and cleaning up debris inside or near a wellbore, said method comprising the steps of:

providing a wellbore having a casing;

inserting a zonal isolation plug, a perforating tool and a spearhead or breakdown aqueous acidic composition into the wellbore, wherein the aqueous acidic composition comprises quaternary amines, acetylenic alcohols, prop-2-yn-1-ol, naphthalene, aliphatic hydrocarbons, and propane-2-ol;

securing the plug in the wellbore at a location slightly beyond but proximate to a predetermined location;

positioning the perforating tool at said predetermined location;

perforating the wellbore with the perforating tool thereby creating a perforated area in the casing and cement allowing access to the formation; and allowing the spearhead acid to come into contact with the perforated area for a predetermined period of time sufficient to prepare the formation for fracking or stimulation.

7. A method to perform a downhole operation of drilling with acid to increase a rate of penetration (ROP) through cement plugs or carbonate-based formation, said method comprises the following steps:

inserting a drilling tool inside a wellbore;

injecting an aqueous acidic composition into the wellbore concurrently with the drilling tool, wherein the aqueous acidic composition comprises quaternary amines, acetylenic alcohols, prop-2-yn-1-ol, naphthalene, aliphatic hydrocarbons, and propane-2-ol;

position the drilling tool within the wellbore at a point requiring drilling;

contacting the surface requiring drilling with the acid and begin drilling;

continue the drilling operation until desired distance has been achieved; and where the aqueous acidic composition is sufficiently balanced to complete the operation of dissolving the acid soluble debris within a time period which will leave said tool with acceptable corrosion damage from exposure to the acidic composition.

\* \* \* \* \*